2,884,731

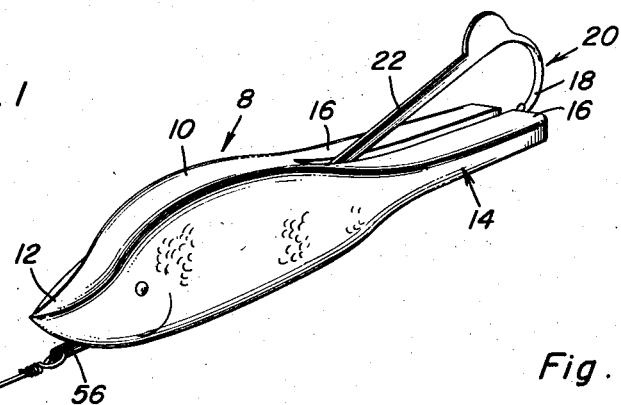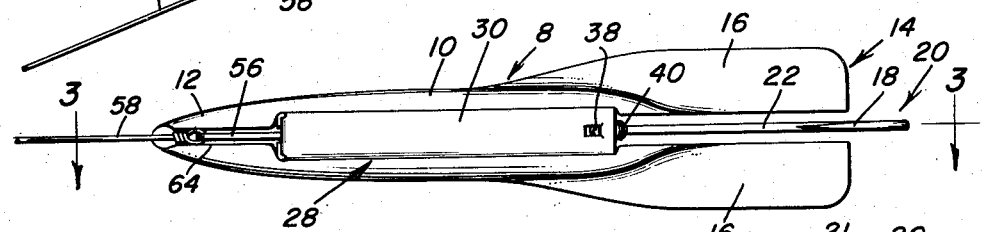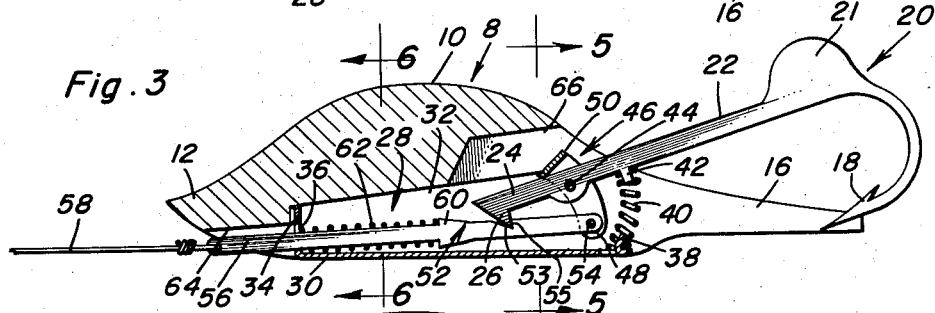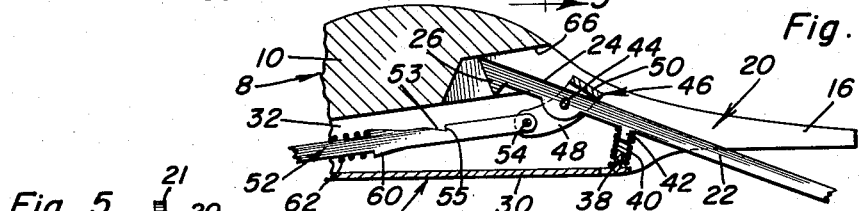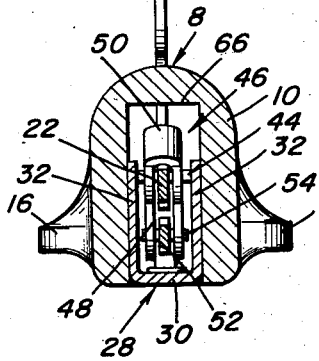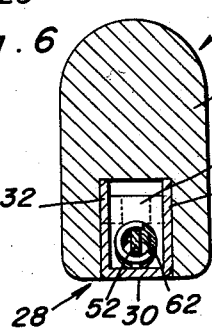
Thomas G. Hodgson
Donald C. Hodgson
Myron J. Hodgson
INVENTORS United States Patent Office 2,884,731
Patented May 5, 1959

WEEDLESS FISH LURE

Thomas G. Hodgson, Donald C. Hodgson, and Myron J. Hodgson, St. Maries, Idaho

Application October 2, 1956, Serial No. 613,414

2 Claims. (Cl. 43—35)

The present invention relates to an improved weedless-type fishing lure characterized by a buoyant plug and a pivotally mounted fishhook the bill or barb portion of which is normally confined and secluded in a slot in said plug and is pull actuated so that it is projected from its place of seclusion and is forcibly thrust into the mouth of the fish to make the catch in a well known manner.

The present invention is improvements on the Jack Robinson Patent 2,727,329, issued on December 20, 1955. The stated patent is, therefore, exemplary of the state of the art to which the present improved construction relates and may well be referred to by the reader.

An object of the invention is to provide a novel projectable and retractible trippable hook and cooperable plug construction which may be readily towed or drawn through weed and brush infested areas without snagging and is effectually set and is thus readied to successfully make the desired catch.

The invention relates to a buoyant plug bifurcated at its trailing end with the furcations defining a hook barb receiving and secluding slot, a fishhook having a shank mounted for operation in said slot, spring means supported between the furcations and cooperating with said shank and serving to lift the shank to a position wherein the hook bill portion is normally secluded in the slot between said furcations, a push-pull rod slidably mounted and having a line attaching eye at its leading end, a trip member operatively mounted between said furcations adjacent to and operatively engageable with the pivoted end of said shank, the adjacent trailing end of said push-pull rod being hingedly joined to said trip member so that when said rod is released and a pull is exerted on the line, the rod is slid toward the leading end of the plug, said trip member swings in an arc, engages and then exerts a downwardly applied force on the shank to overcome the retentive lifting force of said spring means, whereby the hook is then swung down and is thus projected from its place of seclusion in the slot to an extended as well as exposed fish trapping position below the ventral surface of said plug.

In addition to the general objective of simplifying and improving upon the above-mentioned patent other more specific objects, features and advantages will become more readily apparent from the succeeding description of the details taken in conjunction with the accompanying sheet of drawings.

In the drawings:

Fig. 1 is a perspective view of the improved weedless fish lure which is set and ready for use;

Fig. 2 is a bottom plan view of the same;

Fig. 3 is a central lengthwise section on the plane of the line 3—3 of Fig. 2 with portions appearing in elevation and showing the trap-type fishhook set and ready for use;

Fig. 4 is a fragmentary rear end view related to Fig. 3 and showing the relationship of parts when the fishhook has been released and projected to the position required to make the catch; and, Figs. 5 and 6 are sections on the respective lines 5—5 and 6—6 of Fig. 3.

In the drawings the numeral 8 designates the plug proper which may be of any appropriate buoyant material, suitably colored and appropriately shaped to meet the requirements in fishing for game fish. The plug may be said to comprise a central or body portion 10, head portion 12 and tail portion 14. The tail portion is centrally bifurcated and defines spaced parallel furcations 16 and an intervening slot in which the barbed bill 18 of the hook portion of the fishhook 20 is normally secluded in the manner shown. The fishhook embodies the shank 22 having an extending end portion denoted by the numeral 24 and terminating in a lateral V-shaped portion 26 constituting a hook-like detent in the manner shown. This fishhook and the complemental or companion parts, referred to generally as mechanism, are mounted in a metal insertable and removable housing or sheath generally referred to by the numeral 28 and comprising a flat bottom or bight portion 30 and a pair of spaced parallel vertical side walls 32 and having a closed front wall 34 with a guide hole 36 therein. The rear end of the channel portion of the sheath is unobstructedly open and the web or bight portion 30 is here provided with an upstanding hook 38. This hook serves to removably anchor the lower end portion of an appropriately tensioned coil spring 40 the upper end of which is releasably engageable with the lug 42 on the shank 22 and which elevates and holds the fishhook in the cocked or so-called "set" position seen in Fig. 3. To accomplish this the shank is pivoted on a horizontal shaft 44 mounted between the rearward end portions of the walls 32.

The shaft 44 also serves to mount an inverted U-shaped trip yoke 46 in the sheath. More specifically, the arms 48 of the yoke are hingedly mounted on the shaft and the bight portion 50 bridges over or straddles the upper edge portion of the shank 42. The arms 48 are slightly curved or of arcuate form as shown in Fig. 3. A push-pull rod or link 52 is mounted for nominal reciprocation in the sheath and has its rearward end portion hingedly connected at 54 with the lower ends of the yoke arms. The intermediate portion of the rod passes slidably through the aforementioned guide hole 36 allowing the forward end to protrude at 56 and to provide for the connection of a fishing line 58 thereto. There is a shoulder 60 on the intermediate portion of the rod which accommodates a coil spring 62, said spring surrounding the rod and being interposed between the shoulder 60 and the apertured sheath wall 34. The spring 62 is properly tensioned relative to the light-tensioned spring 40.

The bottom or ventral side of the body and head portions 12 and 10 is recessed to provide a groove 64 at the front for the reciprocable rod 52 and to provide a recess into which the sheath is fitted so that the sheath is substantially, if not fully, housed in the recess. In fact, the recess has an upper pocket-like extension 66 which provides a stop or abutment for the upwardly swinging detent-equipped end 24 and 26 of the pivoted or hinged fishhook shank. It follows that all of the principal parts or elements are assembled and satisfactorily mounted in the sheath to provide a readily insertable and removable unit.

It is obvious that the means for overcoming the light-tensioned spring 40 is the already mentioned inverted U-shaped trip yoke and the means for mechanically releasing and actuating the yoke is the push-pull link or rod 52. The normal set or cocked state of the lure is shown in Fig. 3 wherein it will be observed that the detent 26 on the extension 24 is releasably engaged with the keeper shoulder 55 at the rear end of the notch 53. When, as is obvious, the lure is taken by a fish, the action of the jaws of the fish closing on the fin 21 of the fishhook and the tail portion 14 of the plug 8 squeezes the parts 14 and 20 together and thus lifts the spring retained detent 26 from the keeper notch 53 and shoulder 55 and this action frees the push rod or link 52 from its previously latched state. With the fish exerting a pull on the lure, the fisherman yanks the fishing line 58 with the result that the rod or link 52 is slid forwardly relative to the plug 8 and the return spring 62 is consequently compressed or contracted. The sliding movement of the link exerts a pull on the rearwardly yoke 46, whereupon the bight portion 50 of the yoke exerts downward pressure on the shank 22 rearwardly of the pivot shaft 44. This cooperation of the stated parts forcibly drives the fishhook from the then released position to the projected position (Fig. 4) and the catch is thus made. As soon as the pull on the line and rod 52 is relieved the spring 62 returns the rod to the position illustrated in Fig. 3 and when the lure is removed from the mouth of the fish the spring 40 automatically lifts and returns the fishhook to its Fig. 3 position whereupon the detent 26 again engages keeper shoulder 55 and the lure is again automatically set for the next expected catch.

Whereas the construction utilized in Patent 2,727,329, owned by the applicants herein named, has been found to be quite complicated, structurally speaking, the instant invention, by comparison, has been greatly simplified. One improvement has to do with the one-piece insertable and removable channel-shaped sheath 28 in which the entire mechanism is mounted and readied for operation. In our improved construction the stirrup 60 in the stated patent is no longer required. A simple coil spring 40 (mounted in the sheath 28) is now used instead of the complicated spring means 37 and 38 in the prior patent. And, too, the improved shape and performance of the trip yoke 46 (compare with the yoke 41 in the patent) now functions to better advantage. Other improvements, which need not be referred to here are also evident. Therefore, a more extended explanation is deemed to be unnecessary.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A weedless fishing lure comprising a plug characterized by body, head and tail portions, said body portion having a lengthwise recess opening through the bottom and rearward end thereof and said tail portion being bifurcated and the furcations thus defined providing a communicating receiving and secluding slot for the usual barbed portion of a fishhook, an elongate one-piece sheath channel-shaped in cross-section and fitted, completely confined and secured in said recess, said sheath embodying a horizontal bottom wall, vertical side walls and a front wall having a guide hole therein, the rearward end of said sheath being unobstructedly open and terminating at the juncture of said body and tail portions, a fishhook having a shank pivotally supported intermediate its ends and between the side walls of said sheath at the rearward end portion of said sheath and its barbed hook portion situated for aligned movable cooperation with the slot between said furcations, a vertical coil spring having its lower end secured to the rearward end portion of said bottom wall and its upper end detachably but operatively connected with said shank rearwardly of the pivoted portion of said shank and serving to lift and retain the shank in a position wherein said barbed hook portion is normally confined and protectively secluded in the slot between said furcations, a rigid spring-biased push-pull rod arranged for reciprocation in said sheath and having its forward portion passing slidingly through and forwardly beyond said guide hole to permit a fishing line to be attached to the extending forward end portion, an inverted U-shaped trip yoke having spaced arcuate arms hingedly mounted between the side walls of the sheath with its bight portion saddled over a cooperating portion of said shank with its forward edge striking the shank forwardly of the pivot point, the rearward end of said push-pull rod being hingedly connected to the lower ends of said arms so that when said rod, by a forcible pull on the attached fishing line, slides forwardly against the tension of its spring through said guide hole, said trip yoke swings in an arc and causes the rearward edge of said bight portion to exert a downwardly applied force on the shank rearwardly of the pivot point to thus overcome the retentive and resisting force of the upper portion of said coil spring, whereby the barbed hook portion is then swung down relative to the furcations and is thus projected from its place of seclusion in said slot to an extended and exposed fish trapping position below said furcations, the upper edge of said push-pull rod being provided forwardly of its rearwardly hinged end with a keeper notch, the forward end portion of said shank being situated above and being substantially coplanar with the notched portion of said rod and terminating in a depending keeper hook which is releasably engaged in said keeper notch, and that portion of said recess which is aligned with and located above said forward end portion of said shank being deepened to provide a clearance pocket allowing said end portion to swing upwardly in an arc, said pocket being closed at the top, the swinging movement of said forward end portion being limited and checked by the closed top of said pocket.

2. A prefabricated device designed and constructed to be installed, as a unit, in a suitable recessed fishing plug having spaced furcations and an intervening slot and comprising a one-piece sheath channel-shaped in cross-section and embodying a horizontal flat bottom wall, spaced parallel vertical side walls and a vertical front wall having a guide hole therein, the rearward end of the sheath being open, a fishhook having a straight shank pivotally supported intermediate its ends on a shaft which is supported between the side walls of said sheath and its barbed hook portion situated for aligned movable cooperation with the slot between said furcations, a vertical coil spring having its lower end secured to an anchoring hook at the rearward end portion of said bottom wall and its upper end releasably but operatively connected with a lateral lug on said shank rearwardly of said shaft and serving to lift and retain the shank in a position wherein said barbed hook portion is normally confined and protectively secured in the slot between said furcations, a rigid spring-returned push-pull rod arranged for reciprocation in said sheath and having its forward portion passing slidingly through and forwardly beyond said guide hole to permit a fishing line to be attached to the extending forward end portion, an inverted U-shaped trip yoke having spaced arcuate arms hingedly mounted on the shaft and confined for operation between the side walls of the sheath with its bight portion saddled over a cooperating median portion of said shank, the forward edge of said bight portion resting atop the shank forwardly of the pivot shaft when the fishhook is cocked and set to operate and the rearward edge of the bight portion being engageable with the shank rearwardly of said shaft when the fishhook has been released, the rearward end of said push-pull rod being hingedly connected to the lower ends of said arms so that when said rod, by a forcible pull on the attached fishing line, slides forwardly through said guide hole, said trip yoke swings in an arc and causes said bight portion to exert a downwardly applied force on the shank rearwardly of said shaft and forwardly of said coil spring to thus overcome the retentive and resisting force of said coil spring, whereby the barbed hook portion is then swung down, the upper edge of said push-pull rod being provided forwardly of its rearwardly hinged end with a V-shaped notch providing a keeper retaining shoulder, the forward end portion of said shank being coplanar with the notched portion of said rod and terminating in a V-shaped detent providing a keeper which is releasably cooperable with said keeper retaining shoulder.

References Cited in the file of this patent

UNITED STATES PATENTS

| | | |
|---|---|---|
| 2,558,121 | Bailey | June 26, 1951 |
| 2,727,329 | Robinson | Dec. 20, 1955 |